United States Patent
Shim et al.

[11] Patent Number: 6,032,255
[45] Date of Patent: Feb. 29, 2000

[54] METHOD FOR BOOTING A PERSONAL DIGITAL ASSISTANT

[75] Inventors: Hyo-sun Shim, Suwon; Chae-hee Won, Seoul; Jae-sung Oh, Seongnam, all of Rep. of Korea

[73] Assignee: Samsung Electronics Co., Ltd., Kyungki-do, Rep. of Korea

[21] Appl. No.: 09/054,406

[22] Filed: Apr. 3, 1998

[30] Foreign Application Priority Data

Apr. 11, 1997 [KR] Rep. of Korea ........................ 97-13420

[51] Int. Cl.[7] ........................................ G06F 9/445
[52] U.S. Cl. .............................. 713/2; 713/100; 710/13; 710/102; 710/104
[58] Field of Search ........................... 713/1, 2, 100; 712/10, 34; 710/129, 100, 3, 5, 13, 101, 102, 103, 104; 341/67; 364/521, 200; 714/36, 38; 395/430; 235/380

[56] References Cited

U.S. PATENT DOCUMENTS

| | | | |
|---|---|---|---|
| 4,626,986 | 12/1986 | Mori | 364/200 |
| 5,027,290 | 6/1991 | Kirk et al. | 364/521 |
| 5,227,614 | 7/1993 | Danielson et al. | 235/380 |
| 5,374,928 | 12/1994 | Moore et al. | 341/67 |
| 5,487,161 | 1/1996 | Koenck et al. | 395/442 |
| 5,715,410 | 2/1998 | Kim | 710/129 |
| 5,737,610 | 4/1998 | Sandig et al. | 395/712 |
| 5,781,921 | 7/1998 | Nichlos | 395/430 |
| 5,815,706 | 9/1998 | Stewart et al. | 713/2 |
| 5,850,562 | 12/1998 | Crump et al. | 712/10 |
| 5,898,884 | 4/1999 | Tsukamoto | 712/34 |

FOREIGN PATENT DOCUMENTS 8-171483 7/1996 Japan ........................ G06F 9/06

*Primary Examiner*—Dennis M. Butler
*Assistant Examiner*—Rijue Mai
*Attorney, Agent, or Firm*—Sughrue, Mion, Zinn, Macpeak & Seas, PLLC

[57] ABSTRACT

A method for booting a personal digital assistant (PDA) using an external memory card is provided. The method includes the steps of (a) preparing an external memory card in which a program for selecting a start-up command is stored, (b) executing a specific start-up command by booting the PDA, (c) executing a program for selecting other start-up commands by inserting the external memory card of the step (a) into the PDA when the step (b) is completed, and (d) executing jobs according to the start-up command selected in the step (c). The hardware switch function is replaced by software by executing a specific start-up command in advance and executing other start-up commands through the application program stored in the memory card of the personal computer during the booting of the PDA. Accordingly, it is possible to reduce fabrication expenses of the PDA, to minimize the PDA, and to flexibly cope with the change of the PDA system.

6 Claims, 3 Drawing Sheets

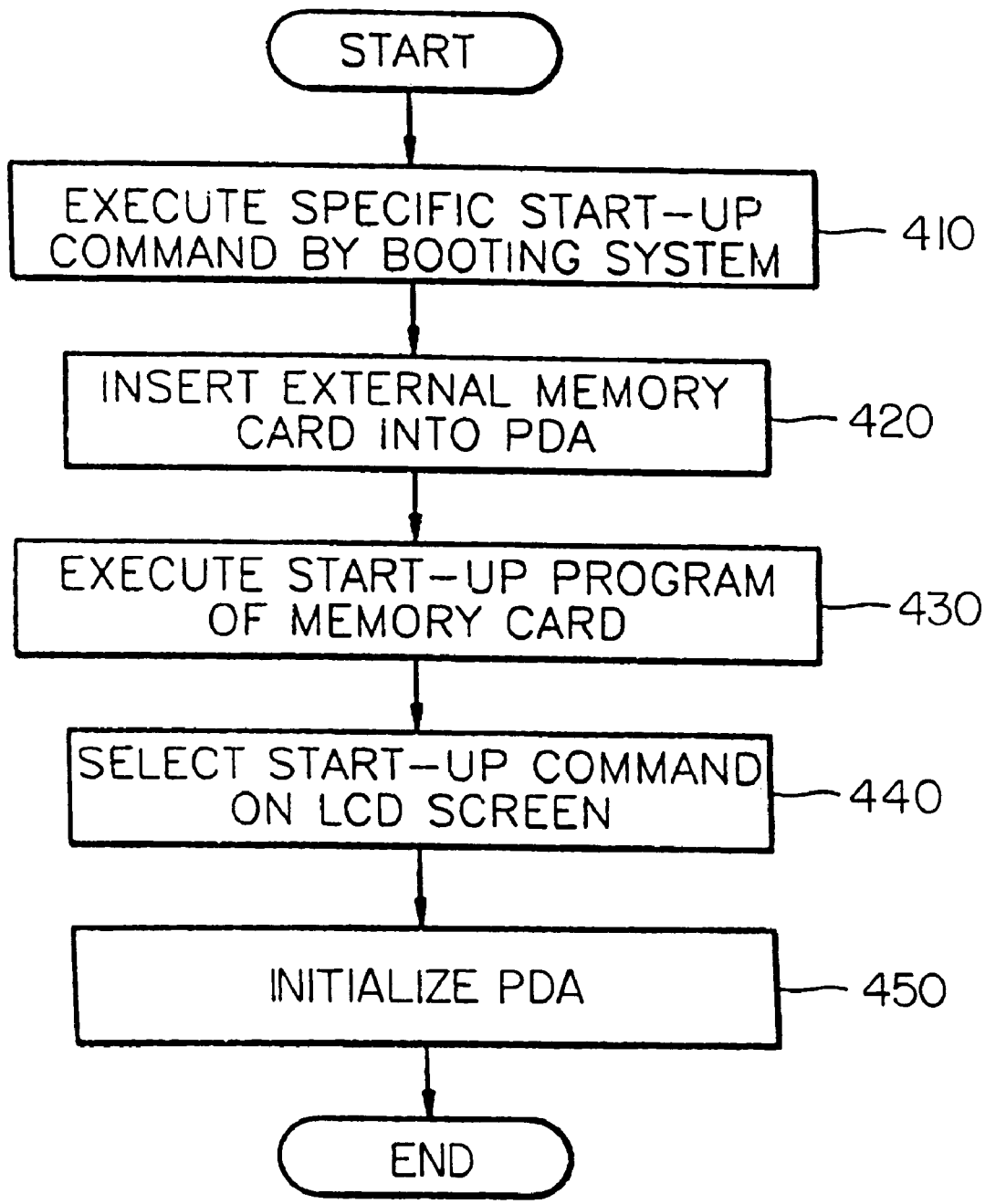

METHOD FOR BOOTING A PERSONAL DIGITAL ASSISTANT

BACKGROUND OF THE INVENTION

1. Field of the Invention

The present invention relates to a method for booting a personal digital assistant (PDA), and more particularly, to a method for booting a PDA using an external memory card.

2. Description of the Related Art

In general, the PDA is a multi-media product having several functions such as a cellular phone, wireless facsimile, a radio pager, and an electronic pocketbook. It is possible for the PDA to transfer information to a host computer and receive information from the host computer, regardless of time and place, by using a portable information terminal. It is also possible to search and receive the information from a data base which is connected to the computer.

When development of an operation program for the PDA is completed, the PDA records the program on an internal read only memory (ROM) to perform various functions. However, a ROM presently in the PDA must be replaced by a new ROM when the contents of the ROM are to be renewed.

Additionally, the conventional PDA includes a switch for controlling a start-up code. The switch is connected to two I/O ports and is controlled to be in the on and off states. If a reset button is pressed with the condition that the switch has also been pressed, a microprocessor executes a start-up command depending on whether the I/O ports are turned on or off. For example, if the two ports are switched on, a DEMON program, corresponding to a debugger program of the host computer, is executed. Otherwise, a default application program is executed.

FIG. 1 is a flowchart showing a method of executing the start-up command in a conventional PDA. In step 210, a desired start-up command is selected using a switch. In step 220, the start-up commands inside the ROM are executed by booting the PDA. In step 230, a desired job is performed according to the start-up command. Therefore, a second deficiency of the conventional PDA is that a s hardware switch is required in order to execute one of several start-up commands. Accordingly, assembly work for producing the PDA increases.

SUMMARY OF THE INVENTION

It is an object of the present invention to provide a method for executing a specific start-up command during the boot operation of a personal digital assistant (PDA) and for executing other start-up commands through an application program stored in a memory card of a personal computer.

In order to achieve the above object, there is provided a booting method for a personal digital assistant (PDA), comprising the steps of (a) preparing an external memory card in which a program for selecting a start-up command is stored, (b) executing a specific start-up command by booting the PDA, (c) executing a program for selecting other start-up commands by inserting the external memory card of the step (a) into the PDA when the step (b) is completed, and (d) executing jobs according to the start-up command selected in the step (c).

BRIEF DESCRIPTION OF THE DRAWING(S)

The above objects and advantages of the present invention will become more apparent by describing in detail a preferred embodiment thereof with reference to the attached drawings in which:

FIG. 4 is a flowchart showing a method of controlling the booting of the PDA according to the present invention.

DESCRIPTION OF THE PREFERRED EMBODIMENT(S)

Hereinafter, a preferred embodiment of the present invention will be described in detail with reference to the attached drawings.

Figure 1:
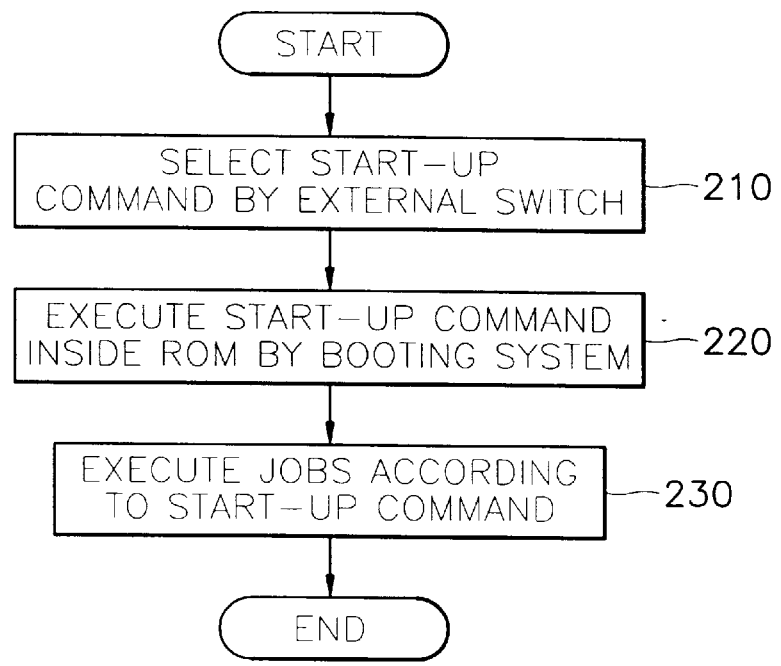
FIG. 1 is a flowchart showing a method of executing a start-up command in a conventional apparatus.
Figure 2:
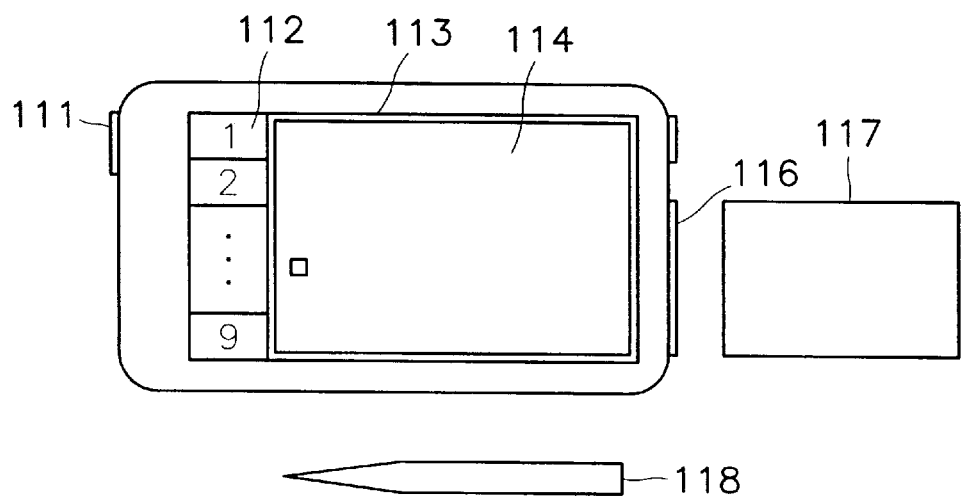
FIG. 2 shows general features of a personal digital assistant (PDA)

FIG. 2 shows the features of a general personal digital assistant (PDA) system. As shown in FIG. 2, reference numerals 111, 112, 113, 114, 116, 117 and 118, respectively denote a RS232C interface, a launcher, a touch panel, a liquid crystal device (LCD), a personal computer memory card industry association (PCMCIA) slot, a memory card and a pen.

Figure 3:
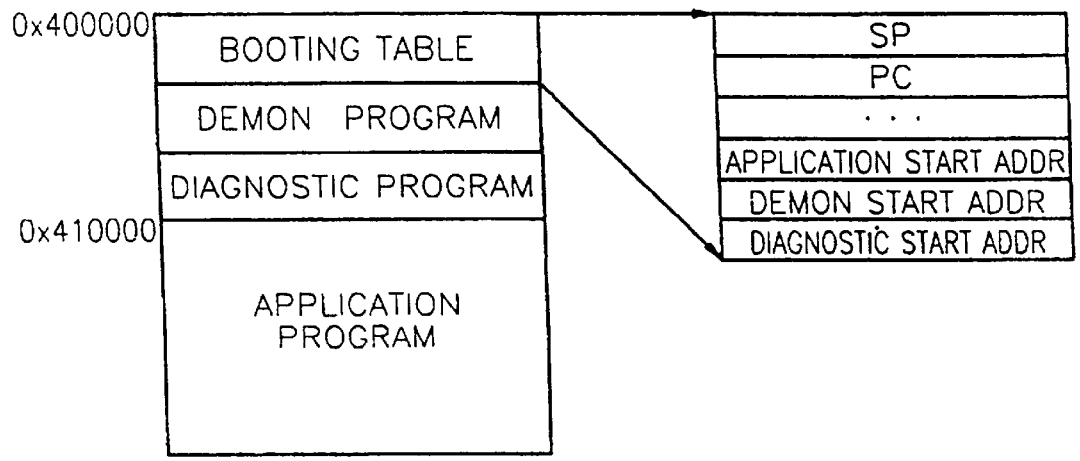
FIG. 3 shows a memory map of an internal ROM in the PDA of FIG. 2.

FIG. 3 shows a memory map of an internal ROM in the PDA. An application program, a DEMON program corresponding to a software debugger program of a host, and a diagnostic program for testing a hardware board are stored in the internal ROM. A starting address of the ROM is 0x400000. The booting table, the DEMON program, the diagnostic program, and the initial application program are sequentially set from the starting address. The order of the programs is fixed. A stack pointer (SP) value and a program counter (PC) value are located in the booting table. Then, an application start address value, a DEMON start address value, and diagnostic start address value are sequentially stored.

FIG. 4 is a flowchart showing a method for booting the PDA according to the present invention. The method includes the steps of executing the start-up instructions in the PDA ROM (step 410), inserting an external memory card into the PDA (step 420), executing the program of a memory card (step 430), selecting another start-up command (step 440), and initializing the PDA according to the set-up (step 450).

Referring to FIG. 4, in the step 410, a user boots the PDA by pressing a reset button and executes a specific start-up instruction. Namely, a microprocessor unit (MPU) (not shown) included in the PDA reads the SP and PC values from the booting table of FIG. 3 and operates an initial application program. The start address of the initial application program may be stored as the default PC value. In the step 420, the external memory card 117 in which additional start-up programs are loaded is inserted into the PCMCIA slot 116 in order to execute another start-up command. The launcher 112 is classified according to the characteristics of programs from 1 to 8. When a number 9 is selected, programs stored in the external memory card 117 are displayed. In the step 430, when the number 9 of the launcher 112 is selected, executable start-up programs of the external memory are displayed on the LCD 114 as icons, for example. When the icons are selected by a touch panel, the desired programs of the memory card 117 are executed. Here, when the memory card 117 is not inserted, a message showing that there are no additional programs is displayed on the LCD 114. In the step 440, based on the set-up command selected on the LCD 114, a desired hardware test routine is executed according to the selected start-up commands.

When the start-up command corresponding to the DEMON program is selected, debugging of the internal ROM of the PDA is executed by connecting a host computer to the PDA at the RS232C interface and executing an X-ray debugger of the host computer. When the execution is completed, a user presses the reset button to execute default start-up commands for operating the initial application program.

Additional start up commands may be supplied to a writable memory in the PDA from the external memory card.

Figure 5:
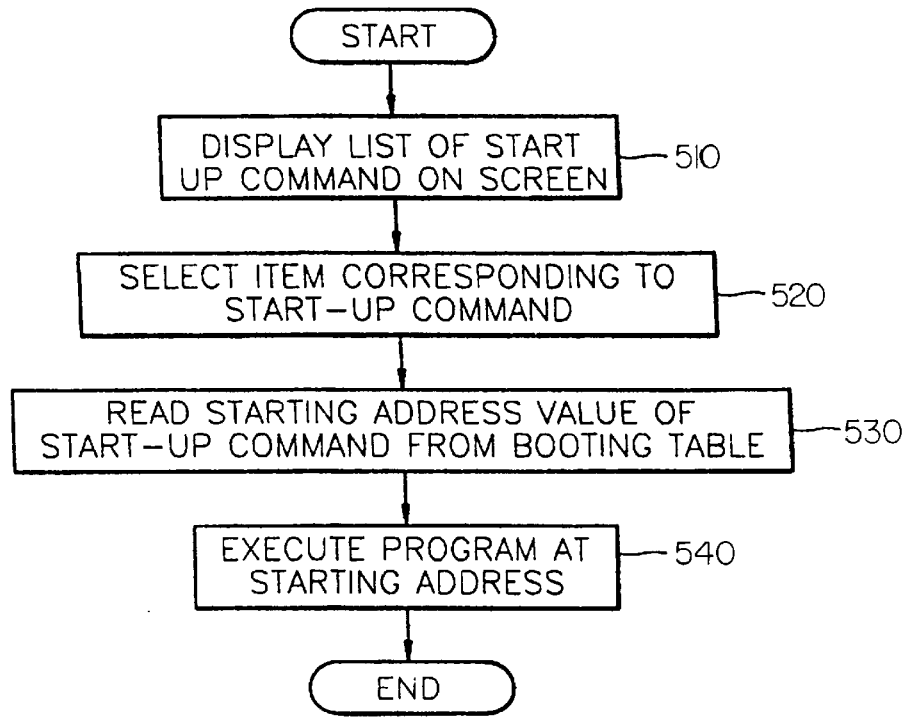
FIG. 5 is a flowchart of a program which can execute start-up commands of a PDA.

FIG. 5 is a flowchart of a start-up command execution program.

Referring to FIG. 5, a list of the start-up commands is displayed on an LCD 114 in step 510. An item corresponding to a desired start-up command is selected in step 520. When the item is selected, the address value in which the start-up command starts is read from the booting table stored in the 0x400000 address of the ROM of FIG. 3, in step 530. A program operation begins in the starting address in step 540. Here, the program is copied in the memory card and used by the PDA. Additional start-up programs may also be supplied from the external memory programs to the PDA.

According to the above-mentioned present invention, the hardware switch function is replaced by software by executing a specific start-up command in advance and executing other start-up commands through the application program stored in the external memory card during the booting of the PDA. Accordingly, it is possible to reduce production expenses, to minimize the PDA, and to flexibly cope with the change to the PDA system.

What is claimed is:

1. A method for booting a personal digital assistant (PDA), comprising the steps of:

(a) preparing an external memory card in which a program for selecting a start-up command is stored;

(b) executing a specific start-up command by booting the PDA;

(c) executing a program for selecting other start-up commands by inserting the external memory card of the step (a) into the PDA when the step (b) is completed; and (d) executing jobs according to a start-up command from the program execution of the step (c).

2. The method of claim 1, wherein the step (c) comprises the steps of:

(c1) displaying a list of the start-up commands on a screen;

(c2) selecting an item corresponding to a start-up command from the displayed list of step (c1); and (c3) reading a starting address value of the selected start-up command from a booting table when an item is selected in the step (c2), wherein said step (d) comprises executing a start-up program at the starting address determined in step (c3), said start-up program corresponding to the selected start-up command.

3. The method of claim 1, wherein a message indicating there is no start-up command select program is displayed on a screen when the external memory card is not inserted into the PDA.

4. A software-based method for booting a personal digital assistant (PDA), which does not require operation of switches for selecting a start-up command, said method comprising the steps of:

preparing an external memory card with a selection program, said selection program being operative to select a start-up command;

executing initial start-up instructions by booting the PDA;

executing the selection program by inserting the external memory card into the PDA;

selecting a start up command from the executed selection program; and executing jobs according to the selected start-up command.

5. The method of claim 4, wherein said selection program execution step further comprises:

displaying a list of start-up commands on a screen;

selecting an item corresponding to a start-up command from the displayed list; and reading a starting address value of the selected start-up command from a booting table stored in the PDA, wherein said job execution step comprises executing a start-up program stored at the starting address value of the PDA, said start-up program corresponding to the selected start-up command.

6. The method of claim 4, wherein a start-up program for the selected start-up command is copied to a memory in the PDA.

* * * * *